United States Patent [19]

Meyer

[11] 3,874,074

[45] Apr. 1, 1975

[54] METHOD OF FABRICATING A STABILIZED COMPOSITE SUPERCONDUCTOR

[75] Inventor: Gundolf Meyer, Birmenstorf, Switzerland

[73] Assignee: BBC Brown Boveri & Company Limited, Baden, Switzerland

[22] Filed: May 30, 1973

[21] Appl. No.: 365,148

[30] Foreign Application Priority Data

May 31, 1972 Switzerland .......................... 8080/72

[52] U.S. Cl. .............. 29/599, 148/127, 174/DIG. 6, 335/216

[51] Int. Cl. ............................................ H01v 11/14

[58] Field of Search ... 29/599; 174/126 CP, DIG. 6; 335/216; 148/127

[56] References Cited

UNITED STATES PATENTS

| | | | |
|---|---|---|---|
| 3,625,662 | 12/1971 | Roberts et al. | 29/599 X |
| 3,665,595 | 5/1972 | Tanaka et al. | 29/599 |
| 3,730,967 | 5/1973 | Nicol | 174/126 CP |
| 3,737,824 | 6/1973 | Coles | 29/599 X |
| 3,763,552 | 10/1973 | Brown et al. | 29/599 |

FOREIGN PATENTS OR APPLICATIONS

| | | | |
|---|---|---|---|
| 1,039,316 | 8/1966 | United Kingdom | 29/599 |

*Primary Examiner*—Richard J. Herbst
*Assistant Examiner*—D. C. Reiley, III
*Attorney, Agent, or Firm*—Pierce, Scheffler & Parker

[57] ABSTRACT

A method for producing electrical superconductors consisting of a great number parallel spaced thin filaments of a superconductive material in which diffusion is effected in parallel spaced zones between two adjoining metallic layers, one being vanadium and the other a copper-gallium alloy by utilization of a foreign substance between the layers establishing similar parallel spaced zones in which diffusion of gallium into the vanadium is either prevented or the superconductive properties of the inter-metallic compound formed by the diffusion is considerably reduced. The layered material with the foreign substance therebetween is formed into rods the axis of which corresponds to the direction of the parallel spaced zones; these rods are then embedded in a cylinder of a highly electrical conductive matrix material such as copper or aluminum, after which the matrix cylinder is subjected to a drawing operation to effect a reduction in its cross section and hence also the cross sections of the rods embedded therein, and then heat-treated to effect the desired diffusion of gallium from the copper-gallium layers to the adjacent vanadium layers along the parallel spaced zones between zones in which diffusion has been prevented or the superconductive properties of the inter-metallic compound formed at such zones have been reduced by the presence of the foreign substance.

17 Claims, 8 Drawing Figures

METHOD OF FABRICATING A STABILIZED COMPOSITE SUPERCONDUCTOR

This invention relates to an improvement in the method of making electrical superconductors, and more particularly to an improved method for manufacturing superconductors of the type having a number of fine filaments of superconducting material.

As of the present time, quite a few different methods of making superconductors composed of filaments of $Va_3Ga$ have become known. The principal advantage of using this material lies in its higher critical temperature of about 15°K, in its higher critical field strength of over 200,000 Oe, in its higher critical current density of over $10^5$ A/cm$^2$ at 150 KG and in its relatively simple method of production and relatively low fabrication cost as compared to $Nb_3Sn$ having similar characteristics, in spite of the higher material cost of vanadium and gallium.

A superconductor made from $Va_3Ga$ can be used principally in a field region of from 100–200 KG, and it can also be used below 100 KG in the event the total current density exceeds that of a NbTi conductor, or in the case where the pulsating field loss is less than that of a NbTi conductor. The present invention is directed to these fields of use.

Up to the present time, the methods which have been disclosed for making $Va_3Ga$ superconductors can be placed in two groups as follows:

*a*. The vanadium is covered by a gallium layer by immersing the vanadium in liquid gallium at a higher temperature or by means of evaporation. The thus obtained conductor is then wrapped up with copper for stabilization purpose and is then drawn into wire. The final wire is then treated at a temperature of about 700° C, whereby the superconducting bond $Va_3Ga$ is formed on the surface of vanadium.

*b*. The vanadium, in flat strip, or in rod form is covered by an alloy of copper-gallium, having 20 percent gallium and the thus obtained material is then drawn into fine wires. The wire is then treated at about 700° C, whereby the gallium selectively diffuses into the vanadium and thus a $Va_3Ga$ bond is obtained.

The second method is more advantageous than the first since in the latter, no fluid phase of the metal appears during the drawing step, and the formation of the bond between the two metals is ten times faster. Also, in this case, the conductor can be surrounded by a copper sheath for the purpose of stabilization.

Known methods of execution teach how a sheet of vanadium, together with a sheet Cu—Ga alloy can be rolled into a strip-form conductor, whereupon formation of the $Va_3Ga$ layer is achieved by means of heat-treatment, as described above. The disadvantage of this method lies in the fact that due to formation of an induction loop in the layer plane, the transversal pulsating magnetic field causes higher magnetization loss. For such application, it is of advantage to utilize another method, in which the vanadium rod is covered by a tube of a Cu—Ga alloy, and is then drawn into fine wires. The rod and the tube can also be embedded into a copper-block having a corresponding hole, which is then drawn and annealed, so that a stabilized conductor can be obtained in an identical manner as in case of the NbTi alloy. The disadvantage of such a process is, that the gallium not only diffuses into the vanadium, but also into the copper and thus impairs the electrical conductivity of pure copper at low temperature.

It has also been suggested to arrange the Cu—Ga alloy in a vanadium tube and the combination then being embedded in a copper block. In this case the gallium cannot reach the copper. But in this case the gallium diffuses only from the inner surface of the vanadium tube upto the middle, so that there exists a certainty against breaking through of gallium through the vanadium tube into the copper.

All of these known methods have a common disadvantage that either the $Va_3Ga$ layer should be formed relatively thick in order to attain a high overall current density in the conductor, or the conductor should be drawn into extremely fine wires, which is also quite expensive.

Recently, it has been discovered that the critical current density of $Va_3Ga$, at a temperature of 4.2° K increases with a decrease in diffusion temperature. Hence, in order to achieve a higher current density, it is desirable to produce as extremely a fine layer of $Va_3Ga$ as possible within a time period from ½ to 10 hours, at a very low temperature. In doing so, in order to keep the pulsating current and the pulsating field losses to a minimum, an economic system of fabrication enabling production of a large number of very fine superconductive filaments is desired.

The principal object of the present invention is to provide an improved method of fabricating a superconductor, particularly one made from $Va_3Ga$, which does not have any of the disadvantages of the prior known processes, and which is composed of a large number of fine filaments of the superconductor material.

The improved process in accordance with the invention is basically characterized by the fact that a "foreign" material is introduced in the form of spaced strips between the two layers from which the conductor is finally formed, or the "foreign" material is diffused, in a strip-like manner into one of the layers, forming a rod. During heat treatment of the final conductor, this foreign material prevents diffusion of material forming a super-conducting inter-metallic compound, or eliminates, or reduces the super-conducting property of such inter-metallic compound. The outer surface of the rod thus formed from the two layers consists completely of a second material. The rod is then embedded in a material having a highly electrically conductive characteristic and is then mechanically worked in such manner that between the adjacent layers and between the outer surface of the worked rod and the embedding material, an intimate bondage exists. The thus formed product is then subjected to a heat treatment.

It is of advantage to choose vanadium and a copper-gallium alloy for the two layers and copper as the material in which the two-layer material is embedded. The copper-gallium alloy layer should have at least 10 percent of gallium, by weight.

For various applications, it is of advantage to choose the thickness of the layer comprising the second material from 1.5 to 4 times, preferably 2.5 to that of the layer comprising the first material.

In order to achieve a proportional deformation capability of the different layers, for the formation of the rod, three layers should be brought together, the materials of which are so chosen that the superconducting filaments are formed in the intermediate layer only.

It is of advantge to select the foreign material in strip form, which is then introduced onto the layer comprising the second material and then diffused by heat treatment.

For the fabrication of a superconductor, for which for the formation of rods, a first material is diffused from both sides onto a layer comprising of a second material, it is of advantage to introduce the foreign material at positions opposite to each other, on both sides of the layer comprising of the second material. Otherwise, during mechanical working there might appear undesired mutual displacement of the foreign material strip on the both sides of the layer comprising of the second material.

It is of advantage to introduce the foreign material onto the layer comprised of the second material, by evaporation, dusting, spraying, rolling or braking.

To hinder the interdiffusion of materials forming the superconducting bond, it is appropriate to choose molybdenum or or tantalum as a foreign material. The reaction of such material with the first material is considerably poorer than with the second material.

Besides, for the elimination or limitation of the superconducting properties at operating temperature of the superconductor, as foreign material, tin or aluminum is preferred. This foreign material reacts approximately in the same manner with the material of the second layer as with that of the first layer.

The foreign material can be applied as coating of uniform thickness to the layer of the second material and then diffused into the latter in the form of e.g. parallel spaced strips extending in the direction of the to-be-formed superconductive filaments by means of an electron beam. The remainder of the foreign material is then removed by means of an acidic solution.

The rods composed of the different layered material can be formed by winding the layered-together materials into rolls have a cylindrical or rectangular, preferably square profile.

For different fabrication processes, it is also advantageous to cut the layered-together materials into strip form and then to form these into a rod having a rectangular profile and which is then covered by a tape of the second material.

The invention is particularly distinguished by the fact that the improved process is used for fabricating a stabilized superconductor consisting of a large number of parallel spaced fine superconductive filaments of $Va_3Ga$.

The foregoing objects and advantages inherent in the invention will become more apparent from the following detailed description of different embodiments thereof and from the accompanying drawings wherein.

Figure 8:
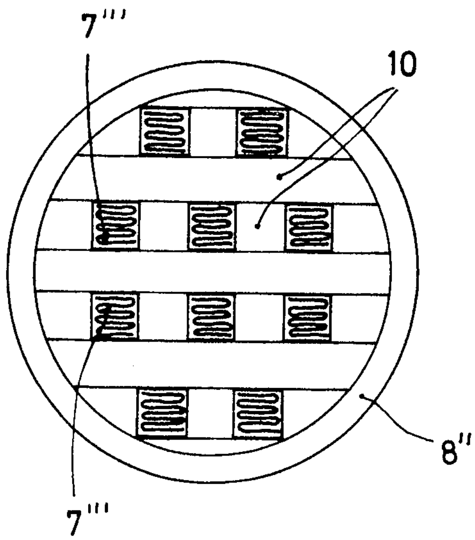
Figure 7:
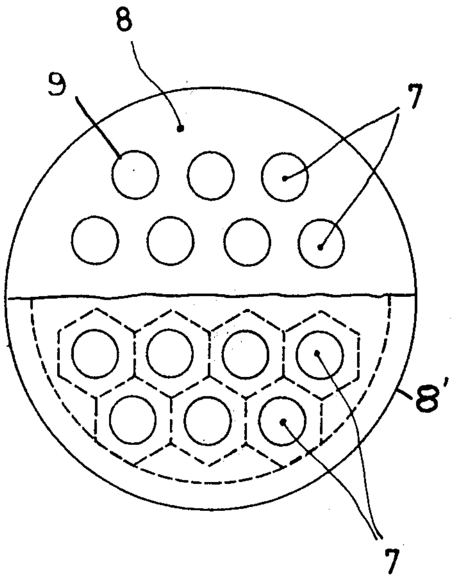
Figure 3:
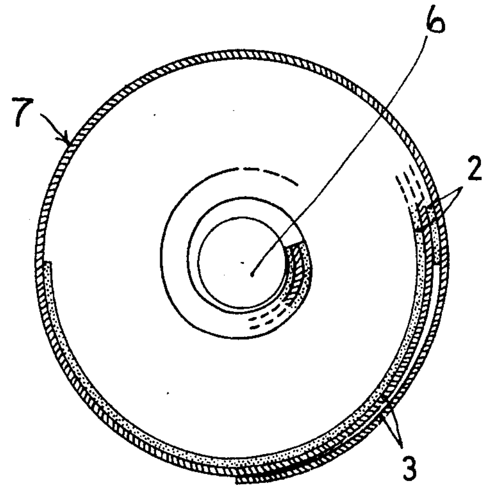

FIGS. 3 t· 6 are sectional views of different rod configurations established for the multi-layered materials which are thereafter further processed into a superconductor having a large number of fine superconductor filaments;

FIG. 7 is a sectional view of a press body according to one embodiment which is provided with bores for receiving a large number of rods formed of superconductive materials, and which is thereafter worked so as to draw the superconductive materials into fine superconductive wires; and FIG. 8 is a view similar to FIG. 7 illustrating another embodiment for the press body in which the rods of superconductor materials are placed for drawing into fine wires.

In the following description, the method in accordance with the invention is described in connection with the production of fine superconductor wires consisting of $Va_3Ga$ but it is to be understood that the same procedure can be utilized for producing superconductors made from other starting materials.

Figure 1:
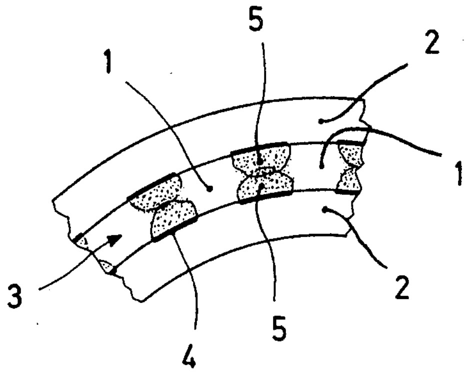
FIG. 1 is a transverse sectional view of a multi-layered superconductive structure manufactured in accordance with one embodiment of the invention.

With reference now to FIG. 1, superconductive filaments 1 are formed by diffusing gallium of a first Cu—Ga layer 2 into a second layer 3 of vanadium. As a matter of practice, however, one vanadium layer 3 is located between two of the Cu—Ga layers 2, and arranged between each layer 2 and the adjacent layer 3 in the direction of the superconductive filaments 1 to be formed, is a foreign substance 4, for example in the form of parallel spaced strips of aluminum or tin extending in the direction of the to-be-formed superconductive filaments which, by diffusing into the zone 5 of the vanadium layer under it will greatly reduce the superconductive properties of the $Va_3Ga$ compound generated during the heat treatment to which the conductor is to be subjected. The strips of the foreign substance 4 are applied to opposite sides of the center vanadium layer 3 and at exactly opposite places so that the impregnation of the center layer 3 by the foreign substance 4 within the desired parallel spaced zones 5 takes place throughout the entire thickness of layer 3. This is accomplished by appropriate choice of the thicknesses of the layers 2 and 3.

It is also possible to apply the foreign substance in the form of a coating of uniform thickness at the center vanadium layer 3, and to cause its diffusion into layer 3, at the parallel spaced places desired, by means of an electron beam, and to remove the remainder of undiffused foreign substance, for example, by means of an acid.

It is likewise feasible to apply the foreign substance as a coating of uniform thickness at the center vanadium layer 3 and to remove the substance at the parallel places desired, for example, means of a spark erosion or electrolysis, thereby leaving the parallel spaced zones 5 coated with the foreign substance 4.

The diffusion of the foreign substance 4 into the zones 5 which exist between the individual superconductor filaments 1 will cause the material within the latter to become so highly resistive that the flow of eddy currents from one filament to an adjacent filament will be dampened substantially. However, the zones 5 must not be resistive to a higher degree than the material of the outer Cu—Ga layers 2 because otherwise such eddy current flow could take place simply by way of the outer layers 2.

If, for example, tin or aluminum are used as the foreign substance, a thermal treatment will generate zones 5 which are contaminated by these substances and which are not superconductive at the operating temperature of the conductor at approximately 4.2° K.

Figure 2:
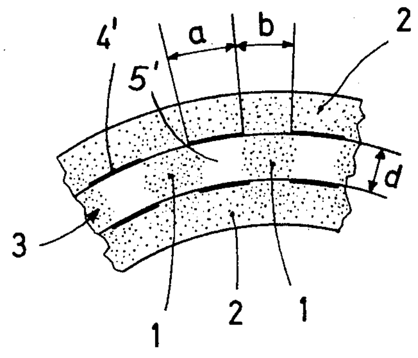
FIG. 2 is likewise a transverse sectional view of another type of multi-layered superconductive structure manufactu· d according to the principles of the invention.

The preparation of the super-conductor, shown by FIG. 2, possessing a great number of very thin parallel spaced filaments 1 composed of $Va_3Ga$ as superconductive material, is similar to the above described example, the difference being that between the outer Cu—Ga layers 2 and the center vanadium layer 3 there is arranged a foreign substance, for example, molybdenum or tantalum in the form of parallel spaced tapes 4' which act as a diffusion barrier to prevent the gallium of the Cu—Ga layers 2 from reaching the zones 5' which are formed between the foreign-substance tapes 4'. As a result thereof, a super-conductive compound cannot arise within the zones 5' of the center vanadium layer 3. Obviously, it is also possible to place the foreign substance at those sides of the Cu—Ga layers 2 which face the vanadium layer 3, but in case of a superconductor consisting of three layers, as illustrated in FIGS. 1 and 2, it would be very difficult to ensure that the foreign substance, after the mechanical deformation for the intimate connection of the adjacent layers, is still positioned on both sides of the center layer at precisely opposite locations.

It will be expedient in many instances if the width *a* and the distance apart *b* of the non-super-conductive areas 5 which are generated between super-conductive filaments 1 being formed, is made equal in magnitude to the thickness *d* of the center layer 3.

After the three-layered composites of either FIG. 1 or 2 have been assembled with the strips of foreign substance 4 placed therebetween, the center vanadium layer 3 having a thickness of about 0.2 mm, for example, and each of the two outer Cu—Ga layers a thickness of about 0.25 mm, for example, they are wound spirally around a slim cylindrical core 6 made from Cu—Ga, in the manner illustrated in FIG. 3 until a rod 7 having diameter of, for example, 10mm is produced. To prevent the wound-on material from unwinding from the core, a thin copper band can be applied to it. The dimension of the vanadium layer 3, in the winding direction, is made longer than that of the two outer Cu—Ga layers 2 so that when the winding-on has been nearly completed, the vanadium layer 3 will extend beyond the ends of the Cu—Ga layers 2 and thus establish a finishing turn consisting completely of a vanadium layer. Thus, the outer surface of the completed rod 7 consists entirely of vanadium and so avoids any contamination of the copper body in which the rods 7 are embedded for stabilization purposes.

FIG. 7 illustrates a cylinder 8 of copper provided with a large number of longitudinally extending bores 9, for example, ninety, into each of which a rod 7 is inserted for further processing. After insertion of the rods 7, the cylinder is sealed and then quickly pressed at a temperature of about 500° C. This temperature is not high enough to effect any appreciable amount of diffusion of gallium from the layers 2 into the vanadium layer 3.

The cylinder 8 after being pressed is then subjected to a standard drawing operation until it reaches a final size having a diameter of about 0.6mm for example. The thickness of the vanadium layer is thereby reduced to about 0.7 $\mu$, and the diameter of each rod 7 will thereby have been reduced to about 30 $\mu$, thus achieving an intermetallic bond on all of the materials. In order to obtain the finally desired superconducting filaments 1, the drawn cylinder 8 is heat treated at a temperature of about 550° C for a period of about 10 hours in order to effect diffusion of gallium from the Ga—Cu layers 2 into the vanadium layer 3 along the parallel spaced zones formed between the corresponding parallel spaced strips 4 of the foreign substance, in accordance with the mode employed, i.e., either that of FIG. 1 or FIG. 2.

Dependent upon the characteristic of the foreign material 4, penetration of the same into the vanadium layer 3, in accordance with the mode of FIG. 1 can be effected simultaneously during diffusion of gallium into the vanadium layer, or during a separate heat treatment prior to the final heat treatment by which diffusion of gallium into the vanadium is effected.

The copper matrix for the rods 7 as shown in the upper part of FIG. 7 instead of being a solid, bored cylinder of copper can be fashioned as a cylindrical tube 8', the round rods 7 being loaded longitudinally into this tube in spaced relation and the spaces between the rods filled in with copper in honeycomb fashion. This mode of matrixing is illustrated in the lower part of FIG. 7.

The rods 7 formed from the three-layered materials 2 and 3 according to either the mode of FIG. 1 or FIG. 2 can have a configuration differing from the cylindrical form depicted in FIG. 3. Thus, in FIGS. 4 to 6, the rods are seen to have a rectangular, i.e., square configuration and, like FIG. 3, the entire outer surface of the rod is in each case constituted by vanadium so as not to contaminate the copper matrix into which the rods are inserted for drawing.

Figure 4:
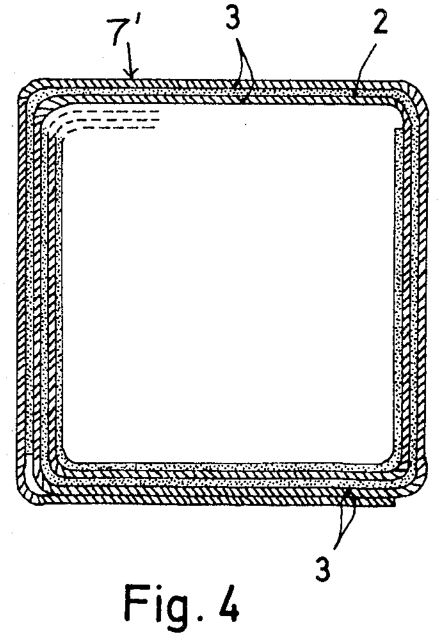

In FIG. 4, a three-layered material 2, 3 with the strips of foreign substance introduced between the layers is wound into a rod 7' a rectangular configuration.

Figure 5:
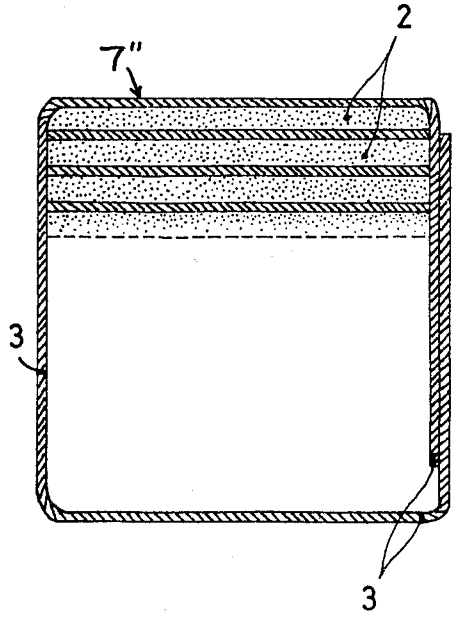

In FIG. 5, individual layers 2 and 3 with the strips of foreign substance therebetween are stacked in alternation to establish a bundle and then finally covered with a layer 3 of vanadium to form a rod 7''.

Figure 6:
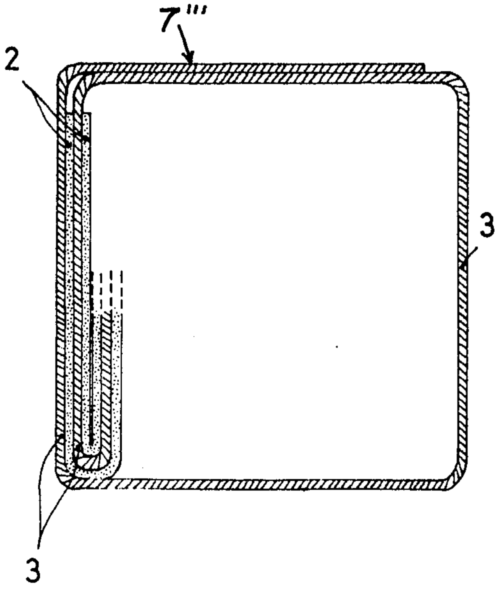

In FIG. 6, a three-layered material 2, 3 with the strips of foreign substance introduced between the layers is folded back and forth upon itself until the desired rectangular configuration is achieved and then finally covered with a layer 3 of vanadium to form a rod 7'''.

FIG. 8 depicts one suitable arrangement for enclosing rods of the rectangularly configured type according to the embodiments of FIGS. 4 to 6 within a copper matrix for drawing into fine wires. The rods, e.g. rods 7''' of FIG. 6 are loaded longitudinally into a cylindrical copper tube 8'' in spaced relation from each other and then the spaces between the individual rods 7''' are filled with filling pieces 10 also of copper so as to fill out the entire volume within the tube 8'. The filled copper matrix tube 8'' is then drawn in the same manner as the cylinder 8 and 8' illustrated in FIG. 7.

In order to avoid any sliding displacement between individual layers, or turns of the bundled or wound rods during pressing or other working operations performed on the matrix cylinders in which the rods are loaded, and which could lead to tearing apart of the layers as a result of local welding therebetween at different times, it is most advantageous to pre-work the individual rods 7 in such manner as to eliminate all hollow spaces as may initially exist between the layers before loading into the matrix cylinder. It is also advantageous to work the rod-filled matrix cylinders in two stages. During the first stage, a strong hydraulic pressure is applied in such manner that all hollow spaces are pressed out without too much deformation of the rods. During the second stage, the cross-section of the matrix cylinder is reduced by drawing to achieve welding of the separated surfaces. It is also most important that the individual rods be formed as compactly as possible and that there be a tight fit between the rods and the surrounding matrix material.

It is also feasible to introduce individual rods of the layered materials into a copper matrix cylinder, draw them to a smaller diameter, cut these into individual lengths and insert the latter into a second copper matrix cylinder for final drawing processing and heat treatment in the same manner as described above. One is thus able to produce very fine superconductor filaments in such fashion.

In addition to copper, it is also feasible to use aluminum as the matrix material.

I claim:

1. In the method for producing electrical superconductors consisting of a great number of mutually spaced fine filaments of a superconductive material by diffusion of a material of a first layer into a material of a second adjacent layer, the improvements which comprise the steps of forming between said layers mutually spaced zones of a foreign substance extending in the direction of the to be formed superconductors and which function to prevent diffusion within said second layer at its zones or to at least greatly reduce the superconductive properties of the intermetallic compound formed at its zones by diffusing into said second layer, forming said layers into rods extending in the direction of the foreign substance introduced between said layers, embedding said rods in mutually spaced relation within a cylindrical matrix made from a highly conductive material, drawing said matrix cylinder into a smaller diameter thus effecting a corresponding elongation and reduction in diameter of said rods and an inter-metallic bonding between the layers thereof, and heat treating said matrix embedded rods at a temperature high enough to effect diffusion of the material of said first layer into the material of the second layer along mutually spaced zones beween zones in which diffusion is prevented by the presence of said foreign substance or between zones wherein the presence of said foreign substance serves to reduce the superconductive properties of the inter-metallic compound formed at its zones by diffusion into said second layer thereby to establish mutually spaced fine superconductive filaments.

2. The method as defined in claim 1 wherein the outer surface of each said rod is constituted by the material of said second layer to prevent contamination of the matrix material.

3. The method as defined in claim 1 wherein said first layer is a copper-gallium alloy, said second layer is vanadium into which gallium from said first layer is diffused and said matrix is copper.

4. The method as defined in claim 3 wherein the outer surface of said rod is completely covered with vanadium to prevent contamination of the copper matrix.

5. The method as defined in claim 1 wherein said rods are formed by winding the layered materials about an axis corresponding to the axis of the mutually spaced zones of the foreign substance introduced between the layers.

6. The method as defined in claim 5 wherein the layered materials are wound about a cylindrical core consisting of the first material to establish a rod having a cylindrical configuration.

7. The method as defined in claim 5 wherein the layered materials are wound about an axis in such manner as to establish a rectangular configuration for the rod.

8. The method as defined in claim 1 wherein said rods are formed by folding the layered materials back and forth to establish a rod having a rectangular configuration.

9. The method as defined in claim 1 wherein said rods are formed by stacking said layers upon each other to establish a rod having a rectangular configuration.

10. The method as defined in claim 1 wherein said rods have a cylindrical configuration and said matrix cylinder is provided with mutually spaced longitudinally extending bores into which said cylindrical rods are inserted.

11. The method as defined in claim 1 wherein said rods have a rectangular configuration which are placed within said matrix cylinder in mutually spaced relation and the spaces therebetween filled with pieces made from the matrix material.

12. The method as defined in claim 1 wherein said first layer is made from a copper-gallium alloy, said second layer is made from vanadium, and the heat treatment subsequent to drawing of said matrix cylinder takes place at a temperature between 400° and 600° C and preferably about 550° C.

13. The method as defined in claim 12 wherein the heat treatment extends for about 10 hours.

14. The method as defined in claim 12 wherein to eliminate brittleness in the superconductive material working is effected under hydrostatic pressure at ambient temperature.

15. The method as defined in claim 1 wherein said matrix cylinder with the rods embedded therein is subjected to a preliminary pressing operation to establish a firm contact between the layers of the rods as well as between the rods and the surrounding matrix material thereby to eliminate any hollow spaces therebetween prior to the drawing operation.

16. The method as defined in claim 1 wherein said first layer is a copper-gallium alloy, said second layer is vanadium into which gallium from said first layer is diffused and said foreign substance is selected from the group consisting of tin and aluminum which serves to reduce the superconductive properties of the intermetallic compound formed at its zones by diffusion into said second layer.

17. The method as defined in claim 1 wherein said first layer is a copper-gallium alloy, said second layer is vanadium into which gallium from said first layer is diffused, and said foreign substance is selected from the group consisting of molybdenum and tantalum which functions to prevent diffusion of the gallium into said second layer.

* * * * *